Oct. 10, 1933.  L. G. MERRITT ET AL  1,929,897
PLYWOOD PRESSING APPARATUS AND METHOD
Filed March 19, 1932    3 Sheets-Sheet 1
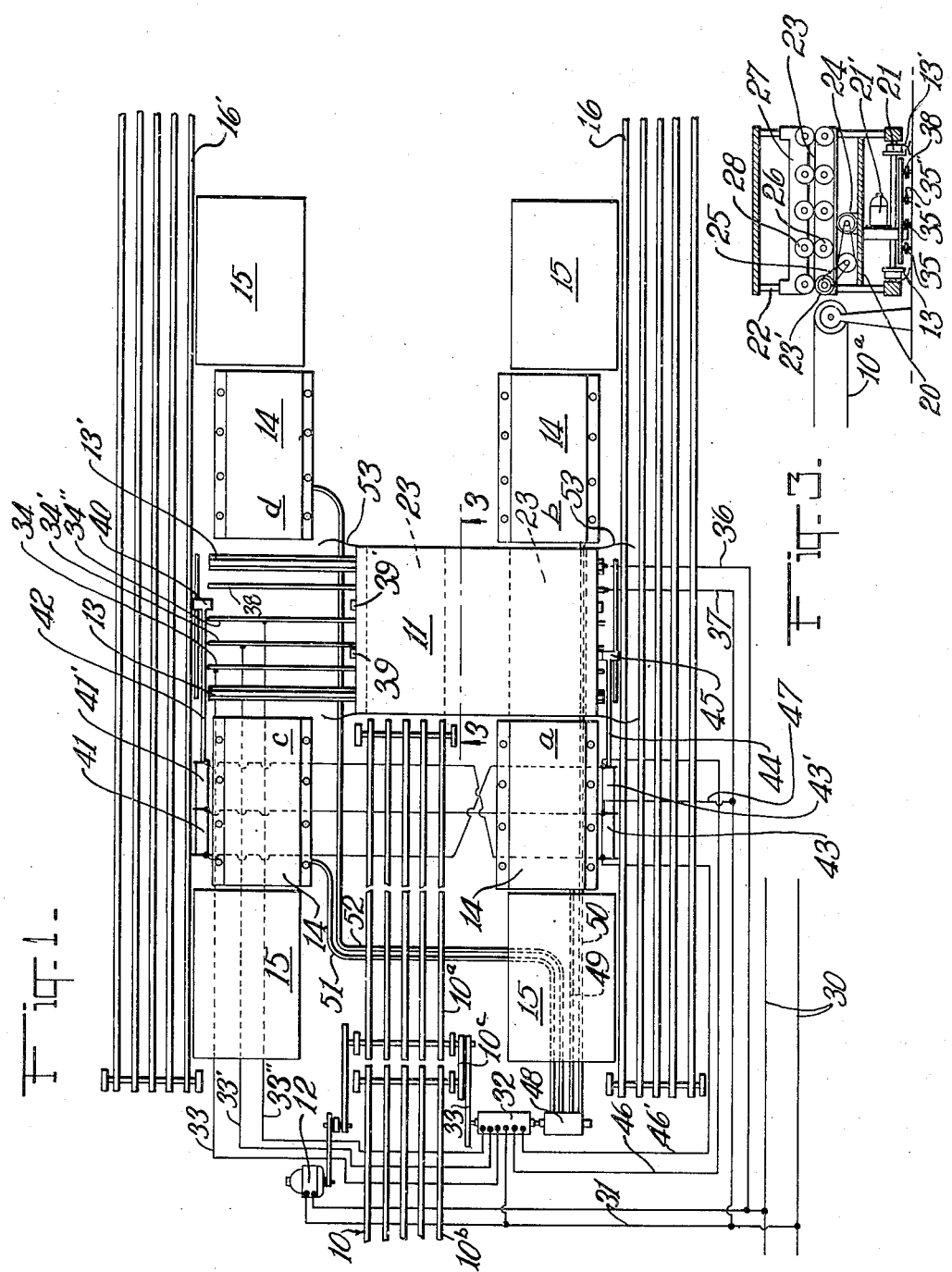
INVENTORS
Louis G. Merritt
and
Ericsson H. Merritt
BY
Warfield & Brown
ATTORNEYS

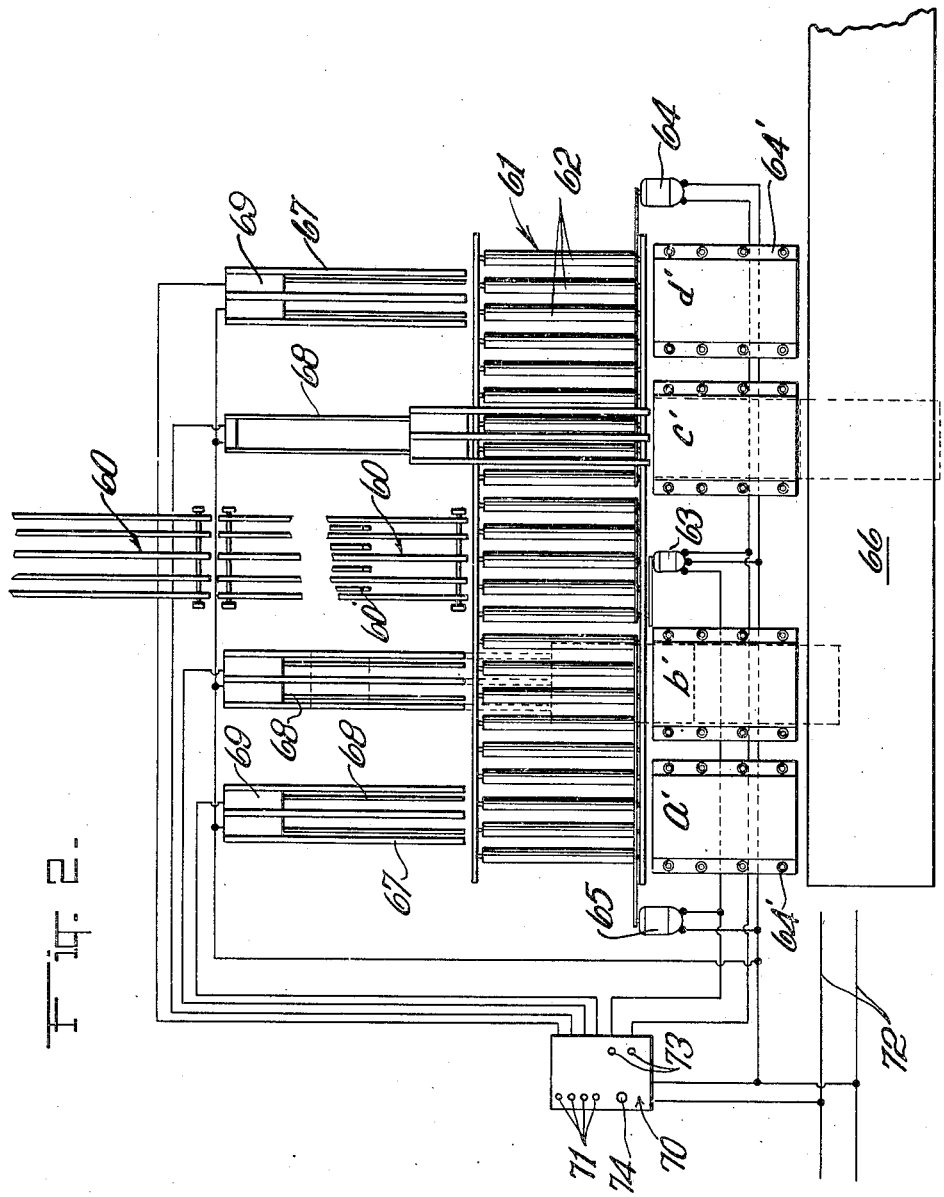

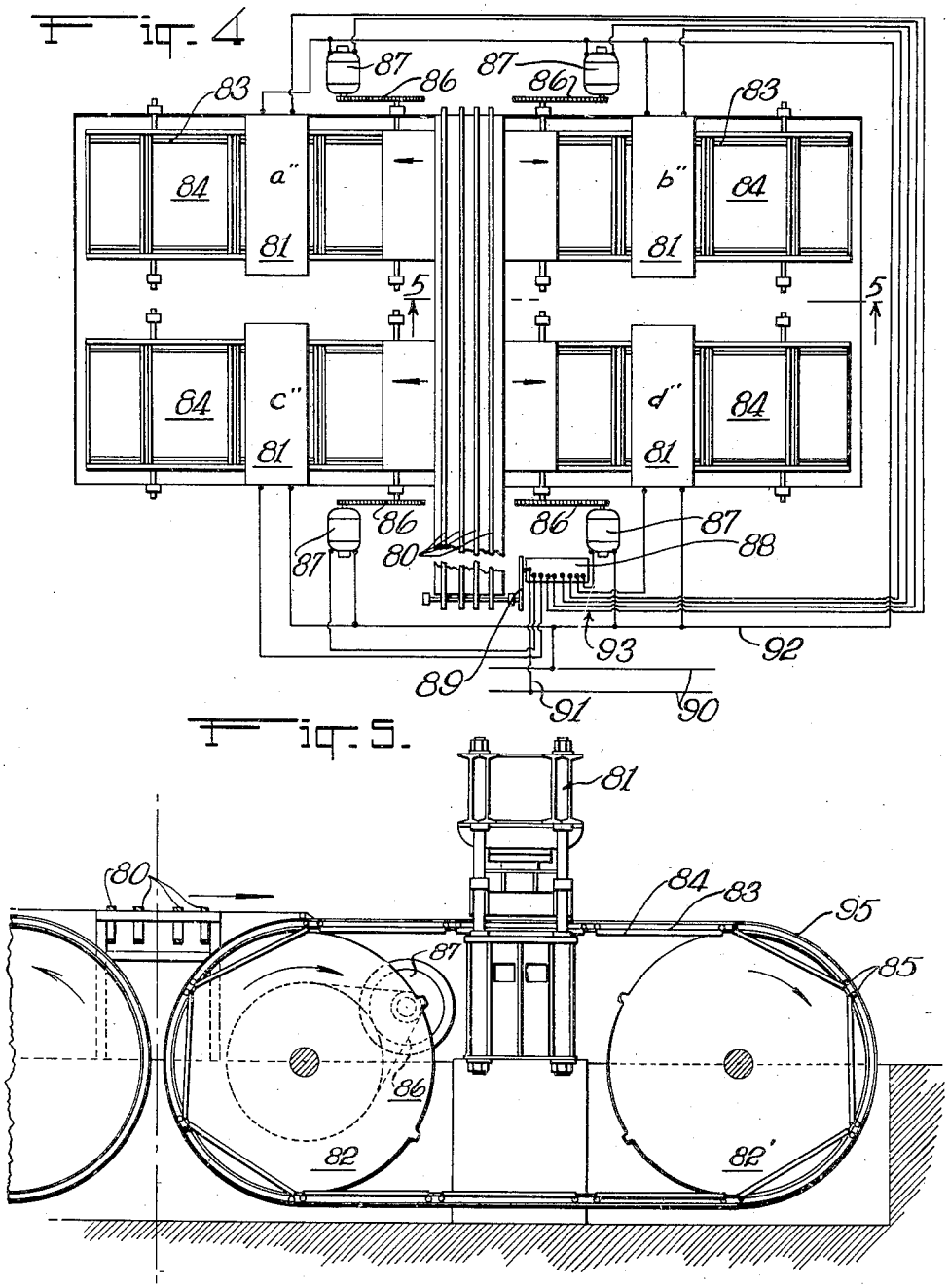

Patented Oct. 10, 1933

1,929,897

UNITED STATES PATENT OFFICE 1,929,897

PLYWOOD PRESSING APPARATUS AND METHOD

Louis G. Merritt and Ericsson H. Merritt, Lockport, N. Y., assignors to Laminating Patents Corporation, Seattle, Wash., a corporation of Delaware Application March 19, 1932. Serial No. 599,942

6 Claims. (Cl. 144—281)

This invention relates to methods and apparatus for pressing materials, and particularly for the bonding of laminated structures such as plywood.

An object of the invention is to provide improved methods and apparatus whereby the pressing of a succession of articles may be efficiently and effectively performed.

A further object is to provide improved methods and apparatus whereby the pressing of articles supplied in succession may be effected in a uniform and satisfactory manner.

A further object is to provide methods and apparatus whereby laminated structures may be bonded in a simple expeditious, and uniform manner.

Another object is to provide improved methods for bonding a series of laminated structures in such manner that the various structures are subjected to substantially similar conditions, and the performing of such operations in a simple and expeditious manner.

A further object is to provide apparatus of the character under consideration and economical to manufacture, and which will satisfactorily perform the purposes for which it is intended.

A further object is the provision of improved means for placing successively-formed articles for pressing.

Still another object is the provision of improved means for effecting the movement of articles before or after pressing.

Other objects of the invention will in part be obvious and will in part appear hereinafter.

The invention accordingly comprises the several steps and the relation and order of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawings, in which:

Fig. 1 is a top plan view showing apparatus for carrying out the method and embodying the invention;

Fig. 2 is a similar plan view embodying a modified form of apparatus;

Fig. 3 is a detailed transverse sectional view taken on the line 3—3 of Fig. 1;

Fig. 4 is a top plan view showing another modified form of the apparatus for carrying out the method and embodying the invention; and Fig. 5 is a view partly in section and partly in elevation of the apparatus shown in Fig. 4, the line of section being taken on the line 5—5 in Fig. 4.

In accordance with the invention, there is provided certain types of apparatus for the successive treatment and pressing of articles such as laminated assemblies through continuously repeated cycles.

Certain procedures and constructions of this nature are disclosed and claimed in the application of Ericsson H. Merritt, Serial No. 576,766, filed November 23, 1931.

The laminated assemblies to be treated may be formed in any suitable manner, as by associating veneer sheets with interposed adhesive material. A specific instance of one manner of assembly is disclosed in the application of Theodore Williams Dike, Serial No. 538,983, filed May 21, 1931, now Patent No. 1,870,041, issued August 2, 1932.

By the embodiment of the invention shown in Fig. 1, plywood assemblies to be treated are carried forward on a conveyor shown generally at 10 and adapted to deliver the assembly to a shuttle conveyor shown generally at 11. The delivery conveyor 10 may be of any suitable form. For example, as shown, it comprises successive sections 10a and 10b of belt conveyors. Those sections may be suitably interconnected, as by a belt shown at 10c, and may be power actuated as by a motor 12, for example. The section 10a may be driven at a higher speed than the section 10b in order to separate the assemblies, if necessary. The shuttle conveyor is adapted to reciprocate back and forth on a short section of a track here shown as comprising rails 13 and 13'. Adjacent to the ends of the shuttle conveyor are disposed a plurality of press units as shown generally at 14. These press units may be of any suitable variety, for example, hydraulic presses having platens adapted to press and treat the assemblies delivered from the shuttle. The presses shown in positions a and b, respectively, are disposed on opposite sides of the shuttle conveyor adjacent one end when in the full line position shown in Fig. 1. The presses in the positions c and d are so disposed as to be adjacent to the other end of the shuttle conveyor in a manner similar to the positions a and b when the shuttle conveyor has arrived to the other end of the section of track shown.

The presses 14 are arranged to discharge each on to a platform 15 disposed adjacently to the press. These platforms may have conveying mechanism associated therewith so as to discharge sidewise onto conveyors 16 and 16' arranged on opposite sides of the press group. As shown, the platforms 15 associated with the presses in the positions *a* and *b* are arranged for discharge sidewise onto the conveyors 16. In like manner, the presses in the positions *d* and *c* discharge onto the conveyor 16'.

The shuttle conveyor here employed has a platform base 20 as shown in Fig. 3 conveniently mounted on wheels 21 for rolling on rails 13 and 13'. A motor 21' is advantageously provided under this base to drive the wheels 21 when desired. The platform base has at its ends frames 22, each of which supports endless conveyor chains or belts 23 passing over pulleys carried on each side of the frame. The pulleys on one side, for example, those shown at 23', are preferably arranged to be power-driven by means of electric motors such as shown at 24 that are coupled through suitable reduction gearing 25 to drive the conveyor belt. Idlers may be arranged as shown at 26 to support the top run of the conveyor in a relatively rigid manner. Slidably disposed above the conveyor belt is a member 27 carrying idlers 28 bearing and reacting against the idlers 26. The frame 22 is preferably extended upwardly sufficiently to hold the member 27 in a manner permitting a little movement with reference to the base. In consequence, it is seen that when a laminated assembly is introduced to the shuttle on one end of its conveyor belt, and one of the motors at 24 set in motion, the motor would drive the belt and draw the assembly in between the idling rolls 26 and 28.

The apparatus shown in Fig. 1 is operated in the following manner:

Assuming that a plywood assembly is carried forward on the conveyor 10 when the motor 12 is set into operation, this assembly would be delivered to one end of the shuttle conveyor when in the full line position. One of the motors 24 is then set into operation as soon as the plywood assembly reaches the conveyor belt on the shuttle conveyor and draws the same in between the idlers 26 and 28. The motor 24 is thereupon stopped and motor 21' is started so as to propel the shuttle conveyor. The shuttle conveyor is thus moved to a position where the end which has just received the plywood assembly is between the press units in positions *c* and *d*. Assuming that press *c* is in open position, the motor 24 opposite the press *c* is again started, but in a reverse direction in order to discharge the plywood assembly into the press at *c*. This press is thereupon closed. The shuttle conveyor when thus moved between the press units at *c* and *d* has its other end opposite the conveyor 10. This end now receives another plywood assembly. This repetition of the loading operation can take place simultaneously with the delivery into the press unit at *c*, since the shuttle conveyor 11 has two motors 24 for the separate conveyor belts associated with each of its ends.

A single motor may be utilized in certain instances as when only two presses are utilized or when the reception of the second plywood assembly awaits the discharge of the first.

When the new plywood assembly has been received, the shuttle conveyor is again started and run to the position shown in full lines in Fig. 1, that is with an end between presses in the positions *a* and *b*. If the press in position *a* is open, the newly received plywood assembly is discharged thereinto and another plywood assembly received into the shuttle conveyor to be discharged into the press in position *d*. When the press in position *d* is charged, the shuttle conveyor is seen to be in a position for receiving still another plywood assembly to be discharged into the press in position *b*. The cycle is now complete and when press *b* is being charged, the press at *c* may be opened. Pressed panels may be removed from the presses in any suitable manner and either before the insertion of an assembly or by the assembly as it is inserted. The present construction is particularly designed for the latter type of operation. The laminated assembly discharged from the press at *c* is discharged onto the platform 15 where it is manually or otherwise discharged upon the conveyor 16' to be conveyed away to a place where subsequent finishing operations are performed.

The apparatus shown in Fig. 1 may be set into operation either manually or automatically. Where automatic operation is desired, there is provided, in addition to the mechanism already described in connection with Fig. 1, an electrical system operating in synchronism with the press control for actuating the various motors in proper sequence. Electric supply buses are accordingly shown at 30 across which the motor 12 is connected by means of conductors 31, to be supplied with current so that it may propel the conveyors continuously. A timing commutator 32 is geared mechanically through the connection 33 with conveyor 10 so as to energize in proper sequence the control circuits for motors 21' and 24.

To accomplish the control of the motor 21' which may be a series motor, three conductors 33, 33' and 33" are shown as leading from the commutator 32 to three conducting rails 34, 34' and 34", respectively, which are placed between the rails 13 and 13' on which the shuttle conveyor 11 travels. Current is collected from these rails for the motor 21', by means of conducting shoes or wipers 35, 35' and 35" carried by the base of the shuttle conveyor as shown in Fig. 3. The circuit is completed and current returned through the grounded rail 13' which has a conducting connection, shown at 36 in Fig. 1 returning to the supply buses. The motor 21' is the motor used to drive the conveyor 11, and is operated by the commutator 32. The commutator 32 is so arranged, as to only energize the motor 21' through half of the travel of the conveyor 11, thus permitting the conveyor to be brought to a gentle rolling stop, by some form of friction means not shown.

The motors 24 are preferably of the shunt variety, and are supplied with current taken directly from across the supply buses. This circuit includes conductors 36 and 37, leading from the other side of the line to a conducting rail 38 disposed parallel to the rails 34, 34' and 34" between the track rails 13 and 13'. The current for actuating these motors passes through this circuit in series with the motors and certain trip switches, for example, as shown on the frame of the shuttle conveyor at 39 and 39'. To trip these switches as desired, an arm is provided at 40. To operate the switches 39 and 39' alternately the arm 40 is moved to-and-from by electrical solenoids shown at 41 and 41', which effect the motion of the arm 40 through the medium of the rod 42 shown as connecting the arm 40 with the solenoids 41 and 41'. Similar solenoids 43 and 43' are shown on the other side of the apparatus for actuating a plunger 44 and arm 45, the latter being arranged to actuate trip switches at the other end of the shuttle conveyor.

The apparatus thus far described as may be seen, will work in this manner. When the arm 40 is in the position shown in Fig. 1 and the shuttle conveyor rolls into position between the presses c and d, the arm 40 will contact the switch 39'. The arm 40 in contacting the switch 39' closes a circuit causing the motor driving the conveyor 23 between the presses c and d, to discharge its contents into press d, and at the same time causing the motor driving the conveyor 23, opposite the conveyor 10a, to take in a ply from said conveyor. The switches 39 and 39', and the contact arms 40 and 45 are so arranged and worked, that the conveyor between the presses will discharge its contents either right or left, according to the position of the arm 40 if on the side of the presses c and d, or in accordance with the position of arm 45 when on the side of the presses a and b, but that conveyor 23 which happens to be opposite the conveyor 10a at any time will always work in one direction.

The circuits for actuating the solenoids are shown as comprising a pair of parallel conductors 46 and 46', leading from the commutator 32 selectively to the terminals of the solenoids, there being a common return connection 47 leading to the other side of the supply buses. Thus, by energizing a solenoid at 41, the trip arm 40 is moved to a position to trip a switch at 39 and actuate the motors 24 of the now stationary shuttle to send a ply into one of the presses, and to take a new ply from the conveyor 10a.

Mechanically coupled to, and turning with the commutator 32, is a gland or valve 48 for controlling the ingress and egress of fluid under pressure to the presses in the positions a, b, c and d. Conduits 49 and 50 are shown leading from the valve 48 to the presses in position a and b for this purpose. Similar conduits 51 and 52 are shown leading to the presses in positions c and d. The timing of the mechanism is made such that the time between the opening and closing of each press is equal to the time between the opening and closing of each other press. Thus the automatic opening and closing of the presses is synchronized with the electric operation of the motor 21', whereby when the shuttle has moved from one end of its track to the other, one or another of the presses is open in the proper position to receive the assembly about to be discharged by the motor at 24. The commutator is also arranged to control the reception of a new plywood assembly by the shuttle. In this manner, the cycle of operations is continuously repeated under the control of the commutator at 32 and the operation of the presses actuated by the movement of the gland or valve 48 as long as these movements are kept up by the running of the motor 12.

Accordingly, as will be seen, the treatment of each assembly is made uniform with the treatment of each of the other assemblies.

In order to assure that the assemblies move fully within the press, resilient fingers 53 are provided on the four corners of the shuttle conveyor 11. Each finger acts upon an assembly which has been slid into a press 14 to press the adjacent end thereof fully within the press during the movement of the conveyor 11 back to its opposite position.

A modified arrangement of apparatus is shown in Fig. 2, which utilizes more simple equipment than that shown in Fig. 1 and in the embodiment shown is intended only for semi-automatic operation. A delivery conveyor is shown generally at 60 adapted to convey relatively long assemblies in transverse manner onto a conveyor 61 by means of a pusher element 60' such as that described in the copending application of Ericsson H. Merritt, Serial No. 576,766, filed November 23, 1931, and provided with a plurality of rotating bars 62 which are driven in sections. In the illustration shown, there are three sections, namely, a central section consisting of four bars driven by an electric motor 63 which is electrically connected, as hereinafter more fully explained, so as to be reversible. The bars shown on the right of the central section are driven by a motor at 64 so as to move assemblies received from the central section toward the right. In a similar manner, the section of rollers on the left are driven by a motor 65 arranged to drive the rollers so as to move assemblies which are received from the central section toward the left. Opposite the left-hand section of the conveyor having rollers 62 are positioned two assembly-treating presses 64'; that opposite the extreme left-hand end of the conveyor 61 is in the position denoted a'; that next to it in the position denoted b'. Similarly two presses are shown in position c' and d' which are opposite the other end of the conveyor 61. These presses as shown are in position to receive plywood assemblies from the conveyors 61 at one end and to discharge the same at the other end upon a receiving conveyor 66 which carries the plywood assemblies when discharged away to points where subsequent finishing operations may take place.

To effect movement of an assembly from the conveyor 61 into a press 64' in one of the four positions, there are associated with the conveyor 61 four sets of pusher bars 67, these pusher bars being operatively disposed along run-ways or tracks on the other side of the conveyor 61, respectively, opposite the presses with which they are intended to cooperate. The track or ways for the pusher bar 67 opposite the press in position a' is shown at 68 and carries a frame 69 which moves the bars forward between the rollers 62 to push an assembly thereon into the press in position a'. The press in position a' has, of course, been opened so as to receive the assembly when the pusher bars are actuated. It is also seen that the pushing of a new assembly into a press at the same time causes a discharge of a treated assembly upon the receiving conveyor 66 if the press when opened has just completed a treatment of such assembly. These pusher bars are designed to be selectively operated in any suitable manner, for example, by electric motors 135 adapted to move the frames 69 on the tracks 68. To actuate such electric motors, the system shown is provided with four actuating electric circuits leading from a control box 70 which may be of the push-button variety and is shown as having four push buttons 71 to operate these circuits selectively. This control box is supplied with current from the bus bars, 72. A pair of push buttons 73 are also shown on the control box 70 to actuate the motors 63, 64 and 65, one push button working the motors 63 and 64, clockwise, the other button working the motors 63 and 65, counter-clockwise.

In operation, the delivery conveyor at 60 is in continuous operation to deliver assemblies upon the conveyor 61. Such assembly is to be delivered either to the right or to the left. The operator who stands adjacent the control box 70 pushes one of the buttons 73 which will cause, for example, motors 63 and 65 to rotate simultaneously to deliver the assembly toward the left. When the assembly has reached a position opposite a suitable press, for example, that in position $a'$, a stop push button such as shown at 74 is pushed to arrest the motors and leave the assembly in a position to be delivered to the press which is now open, thereupon a push button at 71 is pushed to actuate the set of pusher bars 67 opposite the press in position $a'$. This motion of the pusher bar pushes in the assembly into position in the press and at the same time causes the discharge of a treated assembly upon the receiving conveyor 66. When this is accomplished, the motor in the pusher bar frame is stopped and the same permitted to return to its original position, for example, by means of gravity, a weight or spring.

If the conveyor 60 is continuously supplying assemblies to the conveyor 61, a second assembly may have been moved opposite the press in the position $b'$ by the same motion which brought an assembly opposite the press in position $a'$; this press, of course is in condition to be charged and discharged in the manner similar to $a'$. In the event of such rapid supply of assemblies upon the conveyor, the third assembly would be on the central section of the conveyor 61 blocking the further reception of the assemblies from the conveyor 60 until disposition has been made of the same. For this purpose, the motors 63 and 64 would now be started, so as to deliver assemblies toward the right. This motion would be stopped when assemblies come opposite presses in the positions $c$ and $d$ and the former cycles are repeated.

In the modified form of invention shown in Figs. 4 and 5, an arrangement of presses is shown in which the assemblies treated are carried through the presses in a continuous cycle of operations by means of suitable conveyors or carriers. These conveyors or carriers may be driven by link-belts moving over suitable sprockets associated with the group of presses. In Fig. 4, a delivery conveyor 80 is shown as adapted to carry assemblies between the presses 81. The press group here shown comprises four presses in positions denoted respectievly $a''$, $b''$, $c''$ and $d''$. Sprocket wheels associated with the press are shown at 82 and 82' and carry chains comprising a series of track links 83 suitably articulated and adapted to support pans as indicated at 84 into which assemblies are dropped when pushed laterally from the conveyor 80. These assemblies are moved toward the presses 81. Each tray element has such dimensions as to accommodate a maximum sized assembly for the press which it supplies. Each tray is supported on its front and rear ends by suitable roller elements 85. The roller elements at each side are arranged to move in one or a pair of endless tracks or guides 95, U-shaped in cross section and in sufficient lengths on their sides to accommodate three trays, one of which substantially fills the press, while the others are disposed at either side. The track links 95 are disposed parallel to the centre line of the trays, the track links in this operation being propelled by the sprocket wheels 82 and 82' to carry the trays through the press. Any suitable power means may be employed for driving the sprockets 82, for example, the gearing 86 propelled by electric motors 87 in the manner illustrated.

In operation, it is seen that when the mechanism is suitably timed by the timing mechanism shown and to be described later, an assembly removed from the conveyor 80 and placed in a tray, for example, one opposite the press in position $a''$, is thereupon advanced under the movable element of a press 81. The press is then closed and remains closed for a suitable period, which may be long enough to permit assemblies to be carried to each of the other presses in the group shown. When a press is opened, one of the motors 87 is set in motion to move the sprocket wheels a sufficient distance, to move the chains so that a new assembly is carried in its tray under the press; the pressed panel being thereby carried out into a position on the further side of the press. In such position, the panel may be removed by an operator or allowed to slide off onto the floor, if desired, during part of the operation.

While the trays here shown are of a conventional variety, any suitable form of tray may be employed, for example one adapted to serve as a caul. The assemblies may, if desired, have additional cauls placed upon their tops.

An electric system to effect such an operation is shown in Fig. 4. It comprises a timing commutator 88. The timer 88, as shown, is suitably driven from the conveyor 80 by means of a belt or chain 89. Electric power is supplied to the timer from one side of the bus lines 90 by the ground lead 91. The other bus line leads off with a conductor 92 to one of the electric connections of each motor and press. The other connection of each motor and press leads back to the timer in the gang shown generally at 93. Hence, since the timer 88 is driven by the conveyor 80, and the presses and motors are controlled by the timer, it is apparent that the intermittent motion of motors and presses will be in direct relation to the conveyor 80.

Since certain changes in carrying out the above method and in the construction set forth, which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described our invention what we claim as new and desire to secure by Letters Patent is:

1. The method of forming plywood and the like, which comprises moving a series of assemblies along a given path, removing each assembly from said path and disposing it on one of a plurality of laterally-movable conveyors, actuating each of said laterally-movable conveyors after an assembly is placed thereon to carry said assembly to a bonding position, stopping the movement of each laterally-movable conveyor and subjecting the assembly thereon to bonding conditions, said assemblies being transferred to said laterally-movable conveyors alternately in succession, and concluding the bonding operation prior to a movement which brings another assembly on said laterally-moving conveyor to bonding position.

2. Apparatus for the formation of plywood or the like, comprising a conveyor adapted to carry assemblies to be pressed, a plurality of presses each disposed laterally of said conveyor and spaced therefrom, a plurality of endless conveyor elements each having an active run movable laterally of the first-mentioned conveyor, each of said latter conveyors extending through one of said presses, and means for periodically actuating each of the latter conveyors and subsequently closing its respective press.

3. Apparatus for the formation of plywood or the like, comprising a delivery conveyor, a group of spaced presses positioned laterally thereof, and a group of lateral conveyors, one lateral conveyor passing through each press, each of said lateral conveyors being arranged to carry an assembly under its respective press to retain the same during pressing, and to carry the finished panel out of the opposite side of said press while carrying a new assembly into the press.

4. Apparatus for the formation of plywood or the like, comprising an endless conveyor, said conveyor comprising a group of trays, a track and a plywood press, said trays being coupled together and adapted to travel about said track, said trays adapted to pass between the platens of said press, means to move said conveyor to carry assemblies into said press and then to stop said conveyor and to close said press and thereafter to open said press and again start said conveyor to carry the finished panel out of said press and a new assembly into it.

5. Apparatus for the formation of plywood or the like, comprising an endless conveyor, said conveyor comprising a group of trays, an oval shaped track, and a plywood press, said trays being coupled together and adapted to travel about said track, said trays being adapted to pass between the platens of said press, means to move said conveyor to carry assemblies into said press and then to stop said conveyor and to close said press and thereafter to open said press and again start said conveyor to carry the finished panel out of said press and a new assembly into it.

6. Apparatus for the formation of plywood or the like, comprising a press, a plurality of trays each adapted to fit within said press, said trays being arranged in the form of an endless chain, a track adapted to serve as a guide for said chain to guide said trays from an assembly-receiving position, and means for operating said chain.

LOUIS G. MERRITT.
ERICSSON H. MERRITT.